(12) United States Patent
Ferreira Da Silva

(10) Patent No.: US 9,785,933 B2
(45) Date of Patent: Oct. 10, 2017

(54) SYSTEM AND METHOD FOR INSTALLMENT PAYMENT TRANSACTIONS

(75) Inventor: Luis Filipe de Almeida Ferreira Da Silva, Brussels (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 13 days.

(21) Appl. No.: 13/042,141

(22) Filed: Mar. 7, 2011

(65) Prior Publication Data
US 2011/0238567 A1    Sep. 29, 2011

Related U.S. Application Data

(60) Provisional application No. 61/311,148, filed on Mar. 5, 2010, provisional application No. 61/311,565, filed on Mar. 8, 2010.

(51) Int. Cl.
*G06Q 40/00* (2012.01)
*G06Q 20/24* (2012.01)
*G06Q 20/10* (2012.01)
*G06Q 20/40* (2012.01)
*G06Q 40/02* (2012.01)

(52) U.S. Cl.
CPC ............. *G06Q 20/24* (2013.01); *G06Q 20/10* (2013.01); *G06Q 20/405* (2013.01); *G06Q 40/02* (2013.01)

(58) Field of Classification Search
CPC ........ G06Q 10/00; G06Q 20/00; G06Q 30/00; G06Q 40/00
USPC ...................................................... 705/3–44
See application file for complete search history.

(56) References Cited

U.S. PATENT DOCUMENTS

| | | | |
|---|---|---|---|
| 6,315,193 B1 | 11/2001 | Hogan | |
| 6,793,131 B2 | 9/2004 | Hogan | |
| 7,076,657 B2 * | 7/2006 | Koukoulidis et al. | ........ 713/171 |
| 8,396,808 B2 * | 3/2013 | Greenspan | ...................... 705/64 |
| 2006/0229965 A1 * | 10/2006 | Walker et al. | ................... 705/35 |
| 2009/0112753 A1 * | 4/2009 | Gupta et al. | .................... 705/38 |

* cited by examiner

*Primary Examiner* — Frantzy Poinvil
(74) *Attorney, Agent, or Firm* — Buchanan Ingersoll & Rooney PC

(57) ABSTRACT

Techniques are provided for a method of installment payment transactions associated with a credit card account. An installment service having one or more servers receives a credit card transaction. An installment payment amount for the transaction is calculated. Based on the calculated payment amount, an installment payment offer is presented to a confirmation device.

24 Claims, 4 Drawing Sheets

SYSTEM AND METHOD FOR INSTALLMENT PAYMENT TRANSACTIONS

CROSS-REFERENCE TO RELATED APPLICATIONS

Priority is claimed to U.S. Provisional Application Nos. 61/311,148 and 61/311,565, filed Mar. 5, 2010 and Mar. 8, 2010, respectively, herein incorporated by reference. The following prior patents and applications are also incorporated herein by reference in their entirety: U.S. Pat. No. 6,315,193; U.S. Pat. No. 6,793,131; U.S. Published Patent Application No. 2007-0250442 (U.S. application Ser. No. 11/560,212, filed on Nov. 15, 2006); U.S. Published Patent Application No. 2005-0209962 (U.S. application Ser. No. 10/914,766, filed on Aug. 9, 2004); U.S. Published Patent Application No. 2009-0037333 (U.S. application Ser. No. 12/219,952, filed on Jul. 30, 2008); and PCT Publication No. WO/2010/042144 (International Application No. PCT/US2009/005029, filed on Sep. 19, 2009).

BACKGROUND

Field of the Invention

The present disclosure relates to a system, computer processing device, computer program recorded on a computer-readable recording medium, and method in which a credit card payment network facilitates and implements installment payment transactions on behalf of an issuing bank.

Description of Related Art

In credit card payment networks, a card network provider (e.g., MasterCard®) operates as an intermediary between a merchant's bank (i.e., acquiring bank) and an issuing bank, through which a credit card customer has an account. As used herein, the term "credit card" refers to credit cards (MasterCard®, Visa®, Diners Club®, etc.) as well as charge cards (e.g., American Express® and department store cards), among other debit cards such as those that are usable at ATMs and many other locations, or that are associated with a particular account, and hybrids thereof (e.g., extended payment American Express®, and bank debit cards with the Visa® logo, among others) or any other present or future financial transaction card having similar characteristics.

When a customer uses his or her credit card as payment for a transaction, the issuing bank, in effect, loans the amount of a transaction to the customer. The issuing bank may impose an interest charge for the transaction, depending on when the customer pays the issuing bank for the amount of the transaction, and potentially other charges. In operation, when a customer uses a credit card to pay for a transaction with a merchant (e.g., at a point-of-sale (POS) terminal, via a remote transaction such as over the phone, a mail-in order and/or a transaction conducted on the Internet), the acquiring bank of the merchant receives payment by the card network provider, which in turn receives payment from the issuing bank of the customer.

Issuing banks offer installment payment options to their credit card customers, by which the issuing bank loans a predetermined amount of money to a customer, and the customer, in turn, is required to pay back the loan over a predetermined prepayment period, based on a contractual arrangement between the issuing bank and the customer. An installment payment option differs from a credit card transaction, in that in an installment payment option, the customer and the issuing bank contractually agree that the customer will pay back the amount of a loan over a specified time period. For example, if the issuing bank loans $300 to the customer, the contractual arrangement may stipulate that the customer will pay $100 to the issuing bank each month for a total period of three months, plus any additional fees such as interest, for example. An issuing bank may use a particular good for which the installment payment option was extended as collateral until the installment loan is repaid in full. In conventional installment payment options, the issuing bank processes the loan after determining the creditworthiness of the customer and the prepayment period.

SUMMARY

Certain exemplary embodiments of the present disclosure may provide an advantageous feature by which a credit card network provider (e.g., MasterCard®) may provide an installment offer service to customers of an issuing bank, on behalf of the issuing bank, shortly after a customer uses his or her credit card for various types of transactions (e.g., transactions over a pre-defined amount). If the customer accepts the offer, then an amount substantially the same as the installment loan is credited back to the credit line, freeing up the credit card for additional transactions, and the installment loan is established. The credit card network provider can provide an installment offer service on behalf of an issuing bank of a credit card customer.

When a customer uses his or her credit card in a transaction, the credit card network provider transmits a message (e.g., SMS message (short text message), and/or an e-mail message if the user possesses a mobile phone and/or personal digital assistant (PDA) configured to send and receive e-mails via a wireless communication medium) to the credit card customer shortly after the credit card customer uses his or her credit card to pay for certain types of transactions.

For example, within the set of credit card transactions that are to be switched (i.e., cleared), the present disclosure identifies those transactions for which an installment service will be offered to the credit card customer (which optionally may be based on issuing bank defined parameters and optionally each issuing bank setting its own parameters or from pre-defined sets of parameters, such as lists of eligible cards and/or lists of eligible transaction types or merchant types and/or minimum or maximum transaction amounts and/or accumulated amounts).

For eligible transactions, the credit card network provider sends an SMS (text message), for example, to the phone number of the credit card customer (which was provided by the issuing bank to the credit card network provider) inviting the credit card customer to reply to the SMS with a pre-defined code if he/she prefers to pay for that transaction in a predetermined number of monthly payments (instead of in the usual manner by which the credit card customer would pay the issuing bank for a credit card transaction). In this manner, the merchant need not be involved in the installment loan, and neither does the issuing bank at this stage.

The credit card network provider receives and validates the SMS responses received from the credit card customer, and reports back to the issuing bank on positive responses, either substantially immediately or periodically (daily, weekly, when requested or upon some triggering event, etc).

If the issuing bank requests the credit card network provider to do so, the credit card network provider can also process the actual installment by initiating the relevant clearing transactions to the relevant card. For example, the credit card network provider can generate a credit (i.e., "payment to") transaction to the relevant card account shortly after receiving the SMS with the offer acceptance and, for each installment payment, generate a purchase transaction for the appropriate installment amount. The initial credit transaction will effectively credit the credit card customer's account for the original transaction value (thus off-setting it). The subsequent purchase transactions will effectively debit the credit card customer for the installment payments (including any fees or interest which are calculated based on parameters provided by the issuing bank) at the appropriate time. All transactions submitted for clearing by the credit card network provider are done so with settlement disabled—so they have no impact on the issuing bank's financial position vis-à-vis the credit card network provider.

BRIEF DESCRIPTION OF THE DRAWINGS

These and other features of the present disclosure will be readily appreciated by one of ordinary skill in the art from the following detailed description of various implementations when taken in connection with the accompanying drawings.

DETAILED DESCRIPTION

SMS-Based Installment Offering

Figure 1:
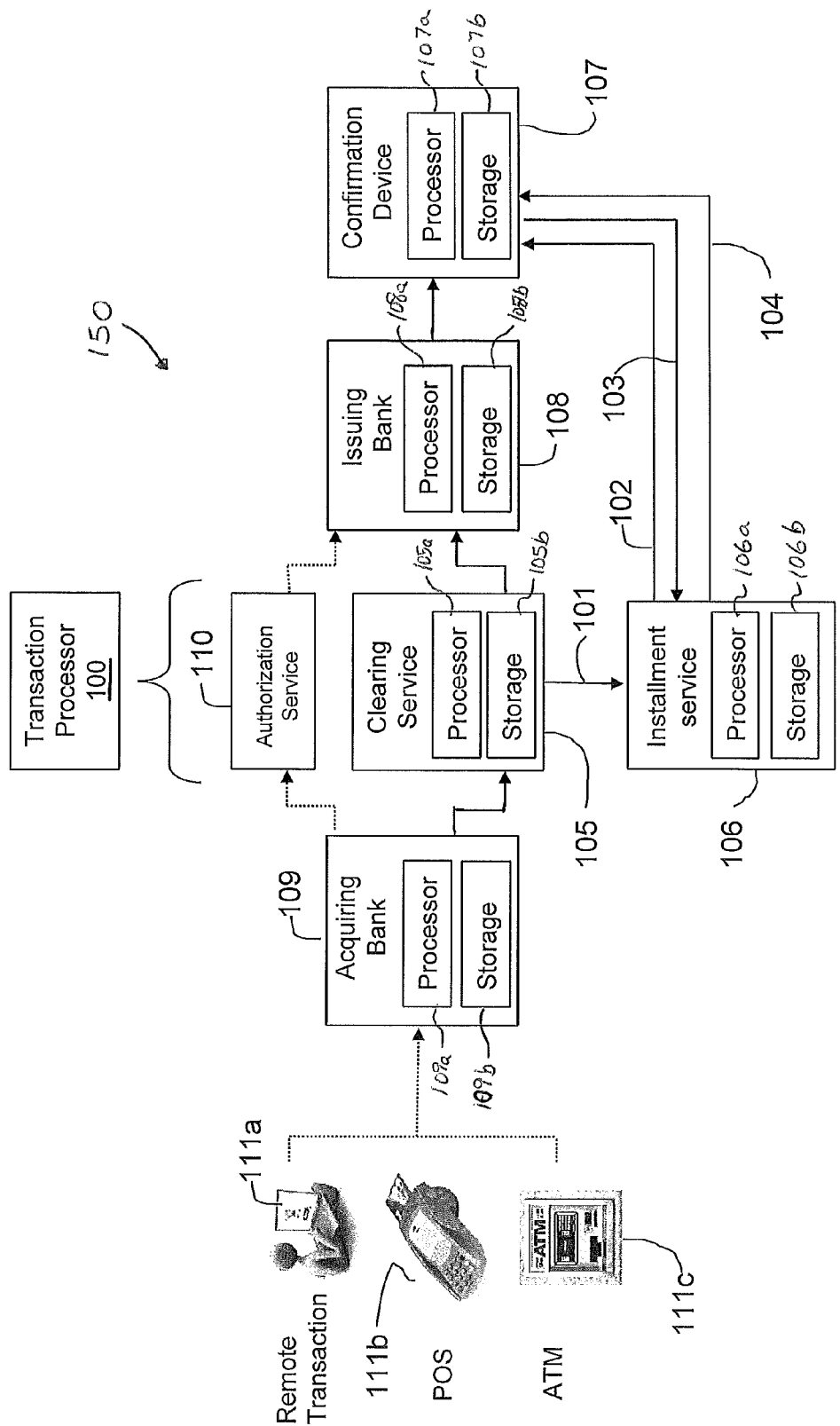
FIG. 1 is a flowchart illustrating a system for installment payment transactions consistent with the present disclosure.
Figure 4:
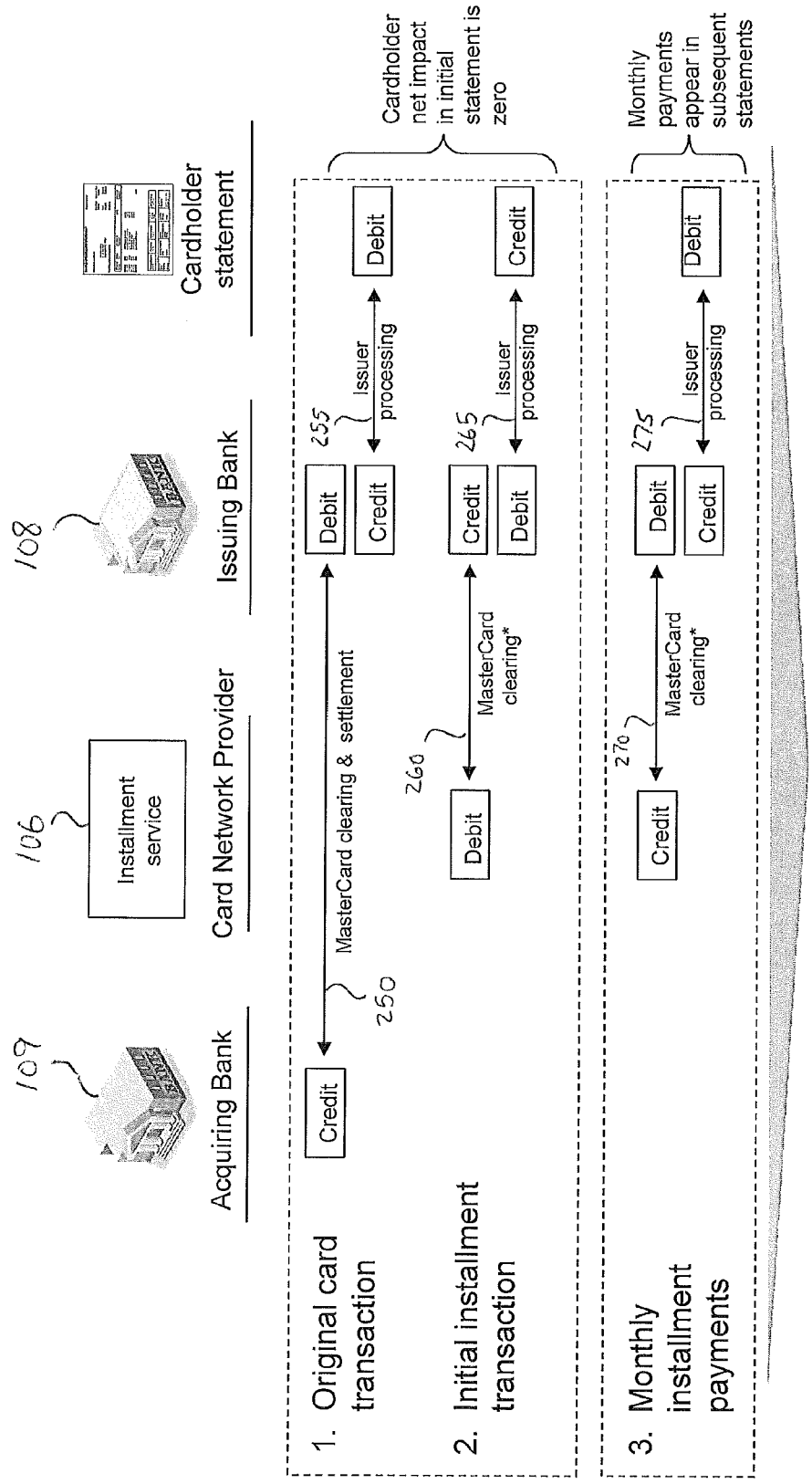
FIG. 4 is a diagram illustrating exemplary installment payment transactions consistent with the present disclosure.

FIG. 1 illustrates a system for installment payment transactions and FIG. 4 illustrates exemplary installment payment transactions. Other operational and structural embodiments will be apparent to persons skilled in the relevant art(s) based on the following discussion.

Referring to FIGS. 1 and 4, the system 150 may include a clearing service 105 that may include a processor 105a and storage 105b, an installment service 106 that may include a processor 106a and storage 106b, an issuing bank 108 that may include a processor 108a and storage 108b, a confirmation device 107 that may include a processor 107a and storage 107b, acquiring bank 109 that may include processor 109a and storage 109b and authorization service 110.

The acquiring bank (and processor) 109 and 109a may be configured to receive remote transactions from a computer 111a, a point-of-sale system 111b and/or an automated teller machine (ATM) 111c and may send them to the clearing service (and processor) 105 and 105a.

In step 101, the clearing service (and processor) 105 and 105a may detect an eligible transaction from the transactions it is receiving from customers (e.g., eligible customers), and may calculate an installment offer. To detect eligible transactions, the clearing service (and processor) 105 and 105a may refer transactions to the installment service (and processor) 106 and 106a and may clear transactions 250 related to BINs (Bank Identification Numbers) associated with the issuing bank 108 that are registered for the installment service 106. The issuing bank then may clear transaction 255 with the credit holder. Eligibility of transactions may be based on the issuing bank 108 defined parameters and each issuing bank 108 using the card network provider 100 may set its own parameters or may select from pre-defined sets of parameters, such as: (1) lists of eligible cards; (2) lists of eligible transaction types; (3) lists of merchant types and/or; (4) minimum or maximum transaction amounts or accumulated installments and/or minimum or maximum credit account balance amounts, among others.

The clearing service's (and processor) 105 and 105a calculation of installment payments for presentation as offers are apparent to those skilled in the art and may include factors such as: (1) the amount; (2) the possible term of the payments; (3) the credit worthiness of the customer; and/or (4) the type of merchandise or service, among others.

In certain exemplary embodiments, eligible transactions may include: (1) purchases; and/or (2) cash withdrawals (e.g., ATM cash withdrawals) among others. Customers via the confirmation device 107 may opt-in or opt-out of such an installment service. In some exemplary embodiments, installment offers may be made if (e.g., only if) the transaction exceeds a threshold (e.g., minimum installment amount). In some exemplary embodiments, installment offers may be made if, (e.g., only if) the transaction is below a maximum accumulated installment amount. Still other criteria, such as product or service type, merchant type or category, and/or nearly any other criteria that might have a bearing on the willingness of the issuing bank 198 and/or the customer to enter into an installment loan arrangement, whether selected by the issuing bank 108 or the customer or both, can be used as eligibility criteria.

In step 102, an installment service (and processor) 106 and 106a may deliver an installment offer SMS message to the confirmation device (and processor) 107 and 107a. In one exemplary embodiment, the confirmation device 107 may include a cellular phone. In another exemplary embodiment, the confirmation device may include a personal digital assistant (PDA). Any device capable of receiving a communication with some likelihood it will be seen by the customer relatively soon after the transaction (e.g., a mobile phone, a PDA, a tablet computer and/or other wireless (mobile) communication devices that are carried by a person) may be used as the confirmation device 107. The information contained in the installment offer SMS message will be apparent to persons skilled in the relevant art(s).

The offer message may contain, for example, information relating to the installment amount, the interest rate, and/or the term of the installment. Such information may, in certain exemplary embodiments, be information determined by the clearing service (and processor) 105 and 105a or the installment service (and processor) 106 and 106a (e.g., both within MasterCard® or other transaction processor). For instance, the clearing service (and processor) 105 and 105a may calculate the transaction amount presented to the cardholder (in the cardholder billing currency), taking into account: (1) the transaction amount effectively cleared; (2) for foreign currency transactions, the transaction processor's (of the card network provider 100) clearing rates, plus an optional issuer-defined markup per transaction that may include an optional percentage markup plus an optional fixed amount markup per transaction, for example; (3) for cross-border transactions, an optional issuer-defined cross-border fee may be added that may include an optional percentage markup with a fixed amount (e.g., a minimal fixed amount) per transaction, which may vary for SEPA & Non-SEPA transactions, and may optionally apply only when there is no currency conversion required. The transaction processor (of the card network provider 100 may calculate the monthly installment amount, taking into account: (1) the type of installment plan selected by the issuer (e.g., number of monthly payments, and whether the first payment is immediate or is after one month); (2) the installment fees selected by the issuer (e.g., that may include an optional annual equivalent interest percentage plus an optional fixed fee per installment, such as one of 8 levels of fixed installment fees, depending on, for example, tiers of transaction amounts (that may be presented to the cardholder) for different types of transactions (e.g., purchase vs. cash withdrawal). Any roundings in the installation payments may be added to the last installment payment.

An exemplary text message may be as follows:
Installment offer:
Your MasterCard is about to be debited 300.00 EUR for a purchase you made yesterday.
If you prefer to pay this amount in 3 monthly payments of 102.35 EUR each with the first payment next month (15% AER), please just reply to this SMS and write the code 1234 before midnight this Thursday.
Please do not reply to this SMS unless you wish to accept this offer.
Your SMS response will be read automatically and any text other than the code above will not be processed. Please visit bank for more info on this offer or call +49 1234 5678 if you wish to stop receiving these offers.

The text message can be issuer-configured, and the maximum text length may be configurable for individual users and may depend on the confirmation device 107 used.

In step 103, the confirmation device 107 may deliver an offer acceptance SMS message to the installment service (and processor) 106 and 106a.

In step 104, the installment service (and processor) 106 and 106a may deliver an installment confirmation SMS message to the confirmation device 107. Such a confirmation message, which can be configured by the issuing bank 108, may be presented (displayed) as follows:

Thank you for your SMS. Your MasterCard account will now be credited for 300.00 EUR and 3 monthly payments of 102.35 EUR will be debited to this same account, with the first one taking place one month from today.
Your 300.00 EUR credit should appear on your next card statement.
For any problems, please call +49 1234 5678 (replies to this SMS will not receive a response).

In certain exemplary embodiments, the information, transactions and computer code to execute processes in each service/entity 105-109 of the system 150 may be stored locally on storage 105b-109b, respectively.

Installment Processing

Figure 2:
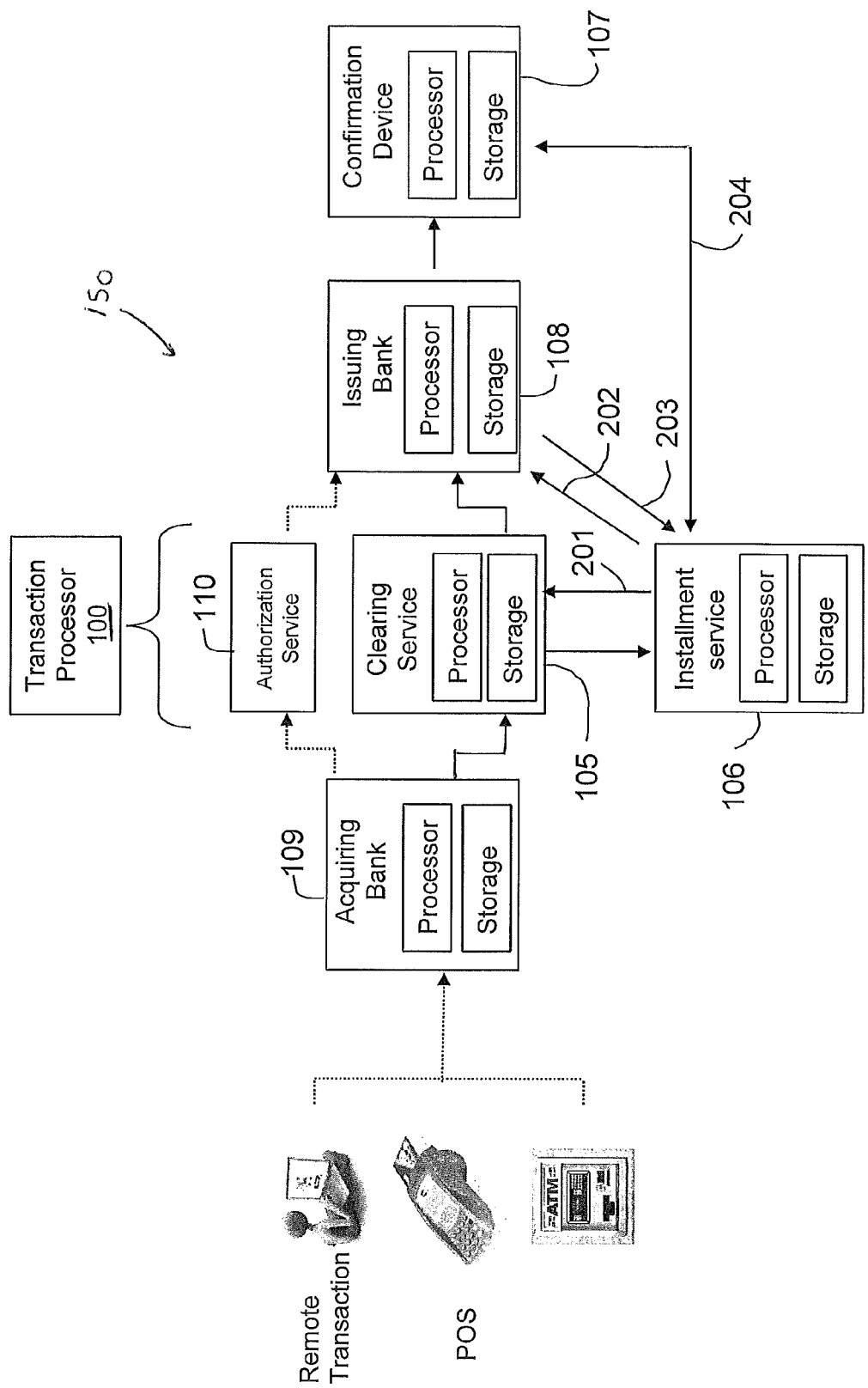
FIG. 2 is a flowchart illustrating a system for clearing service processing of installment payment transactions consistent with the present disclosure.

FIG. 2 illustrates the system 150 for processing installment payment transactions. Other operational and structural embodiments will be apparent to persons skilled in the relevant art(s) based on the following description. Not all of the steps in FIG. 2 must be performed, and might not be performed in the order as described, as will be apparent to persons skilled in the relevant art(s).

In step 201, the installment service 106 provides reporting to the clearing service 105. In one embodiment the installment service 106 and clearing service 105 are a single entity such as a credit card network provider. The reporting will be apparent to persons skilled in the relevant art(s). For instance, the credit card network provider might provide appropriate reporting to the issuer on all accepted installment offers (upon each transaction, a daily or other periodic report, or pulled by the issuing bank 108). The issuer 108 and issuer processor 108a may process the installment payments itself, in certain exemplary embodiments, where basic handling is selected as the operating mode. Other options may be more advanced, and may include, for example, the credit card network provider 100 handling the installment payment flows, providing appropriate reporting, and exception handling mechanisms to the issuing bank 108.

After receiving the offer confirmation from the confirmation device 107, the installment service 106 and 106a may automatically submit a new credit transaction 260 to the issuing bank 108 with the relevant transaction amount (amount quoted in the offer) for the relevant card account to reverse the original credit transactions 250 and 255 (see FIG. 4). For each of the monthly installment payments, the installment service (and processor) 106 and 106a may automatically submit to the clearing service (processor) 105 and 105a a message 201 including a new transaction 260 between the issuing bank 108 and acquiring bank 109 for the relevant installment amount (amount quoted in the offer) generating another transaction 265 between the issuing bank 108 and cardholder. In certain exemplary embodiments, the issuer defines the "Merchant Name" that appears on the cardholder statement for these transactions.

As illustrated in FIG. 2, in steps 202 and 203, the installment service 106 generates, periodically or monthly for the period of the installments, a credit transaction 270 to the issuing bank 108 representing the installment amount, which, in turn, generates another transaction 275 to the cardholder.

In step 204, confirmation of installment payments represented in steps 202 and 203 is delivered from the installment service (processor) 106 and 106a to the confirmation device (processor) 107 and 107a. It will be apparent to persons skilled in the relevant art(s) that step 204 is an optional step.

The issuer bank 108 can define, for example, two types of limits: (1) a minimum installment amount (which limit may be defined based on (per) BIN range) such that an installment offer may only be made if the transaction amount presented to the cardholder is equal to or higher than the installment limit; and (2) a maximum accumulated installment amount (which limit may be defined based on (per) PAN (personal account number) such that the installment offer may only be made if the transaction amount presented to the cardholder is equal to or lower than the balance left on the accumulation limit.

In a basic installment-processing mode, a running weekly limit for offers may be implemented such that at the time of the first offer, the balance is initiated to equal the limit minus the transaction amount presented to the cardholder. Alternatively, the balance may be reduced by an appropriate amount for every subsequent installment offer sent to the cardholder (regardless of whether the offer is accepted or not by the cardholder). In still another alternative, the balance may be re-set to a weekly limit one week after the time of first offer. Any changes (by the issuer) to the PAN's accumulated installment amount limit may take effect the next time the balance is re-set.

Using an advanced installment processing mode, the accumulated limit for installments can be that: a balance is initiated to equal the issuer-defined accumulated installment amount limit; a balance is reduced by an appropriate amount for every installment offer sent to the cardholder; a balance is increased by an appropriate amount if an installment offer expires without being accepted; a balance is increased by an appropriate amount when installment payments are submitted for clearing. Any changes (by the issuer) to the PAN's accumulated installment amount limit would take effect immediately in certain embodiments.

Information to be provided by the issuer bank 108 for the BIN range, in certain embodiments, includes types of transactions for which to make installment offers (e.g., purchases only, purchases and cash withdrawals); minimum installment amount (amount and currency); text of SMS's to be sent to the cardholder (including, e.g., the offer SMS, the offer confirmation SMS, the response to invalid SMS's sent by the cardholder); parameters to determine the transaction amount presented to the cardholder (including, e.g., optional markup for transactions involving currency conversion in the form of % markup and/or fee markup per transaction, optional markup for cross-border transactions (optional markup for SEPA transactions) in the form of % markup, minimal fixed fee per transaction (amount and currency) that are applied for: (i) all transactions (txns); (ii) txns in non-cardholder currency (ccy) only; and/or (iii) txns in cardholder ccy only and optional markup for non-SEPA transactions, again in the form of % markup, minimal fixed fee per transaction (amount and currency), that are applied to: (i) all txns; (ii) txns in non-cardholder ccy only; and/or (iii) txns in cardholder ccy only.

Additional information that may be provided by the card issuer include the method of or algorithm for the calculation of the installment fees, which can be separated into categories (e.g., purchases vs. cash withdrawals), and may be in bands (up to a first threshold at one rate, above that threshold, but below a second threshold at another rate, etc.). The card issuers may also specify the type of installment processing performed by the credit card network provider 100, such as levels of service (e.g., basic vs. advanced processing modes), and, for more advanced services, the text of "merchant name" used for clearing transactions (e.g., text for initial credit transaction, and/or the text for monthly installment payment transactions); and/or the issuer's choice of acquirer (ICA) to be used for the clearing of the installment transactions, such as an ICA owned by the issuer, or a MasterCard owned ICA, for example).

The types of information provided by the issuer for each PAN include: an indication that the PAN is enabled/disabled (with the default being "disabled"); maximum accumulated installment amount; and/or cardholder mobile phone number.

Of course, there are ongoing maintenance tasks. For instance, the issuer may—at any time—modify the information per PAN. Thus, the clearing service 105 and/or installment service 106 might be required to enable/disable generation of new offers for individual PANs (e.g., following a request by the cardholder to stop receiving installment offers), modify the maximum accumulated installment limits, and/or update the cardholder mobile phone number. The issuer may also—at any time—modify the information per BIN-range. Additionally, there may be a need for cardholder servicing and exception handling. This might include the issuer handling cardholder servicing (receiving calls), when using a more advanced model of the installment processing offering, issuers can request the clearing service 105 and/or installment service 106 to cancel installment payment transactions planned for a future date (cancellation/off-setting of transactions already submitted would likely be done directly by the issuer).

Installment Payment Processing

Figure 3:
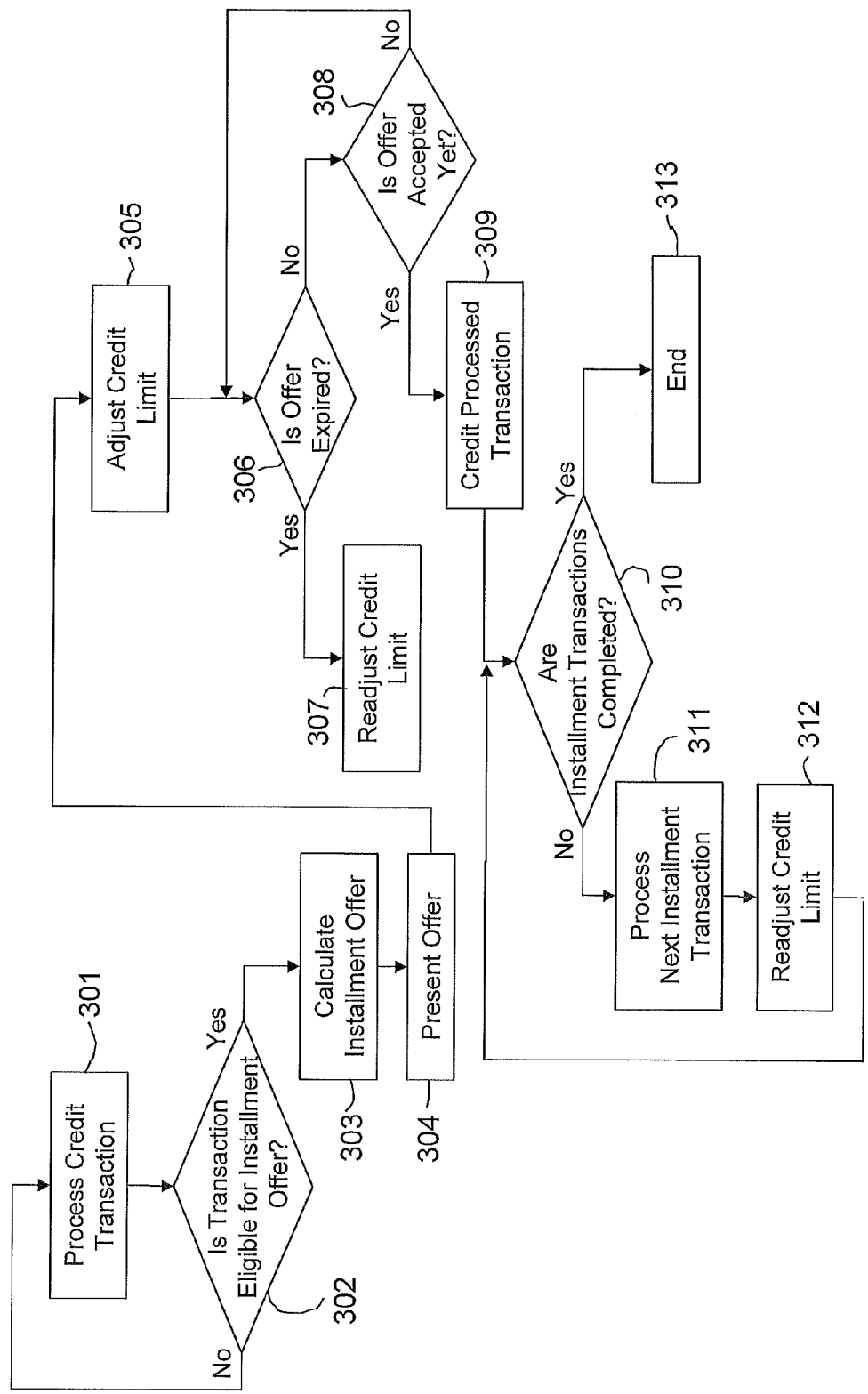
FIG. 3 is a flowchart illustrating a system for processing installment payment transactions consistent with the present disclosure.

FIG. 3 illustrates a flowchart of a system overview of a system for processing installment payment transactions. Other operational embodiments will be apparent to persons skilled in the relevant art(s) based on the following description. In one embodiment, the processing is performed by a clearing service 105 and installment service 106 such as those shown in FIGS. 1 and 2. In another embodiment the processing is performed by a single service, such as a credit card network provider 100.

In step 301, a credit transaction is processed. In step 302, a clearing service 105 determines if the transaction is eligible for an installment offer, e.g., purchases are considered eligible transactions and/or ATM cash withdrawals are considered eligible transactions.

If the transaction is eligible for an installment offer, then the installment service calculates the installment offer in step 303. Once the installment offer is calculated, in step 304, the offer is presented to a confirmation device 107. In one embodiment, the offer is presented as an SMS to the confirmation device 107 (e.g., a mobile telephone or a PDA).

In step 305, the credit limit of the credit account is adjusted to reflect the credit transaction. In step 306, the clearing service checks if the installment payment offer SMS has expired. If the offer has expired, then the system proceeds to step 307, where the credit limit of the credit account is readjusted. If the offer has not expired, then the system moves to step 308, where the installment service 106 checks if the installment payment offer SMS has been accepted. If it has not, the system returns to step 306.

If the installment payment offer SMS has been accepted, in step 309, the installment service 106 credits the processed transaction.

In step 310, the installment service 106 checks if all of the installment transactions have been completed. If the transactions have been completed, then the system has performed all of the required processing of the installment payment transaction is completed. If the transactions have not all been completed the installment service waits and in the interim performs steps 311, where the next transaction is processed, and step 312, where the credit limit is readjusted to reflect the processed installment transaction.

It will be appreciated that the various components of the system, e.g., the acquirer 109, the issuer 108, the communication device 107, the card network provider 110, including the clearing service 105 and the installment service 106, each has a processor and a tangible, non-transitory storage device, and in the case of the system components (e.g., excluding the customer's communication device), may be in the form of a server.

As described herein, for example, the invention may be embodied in software (e.g., a plug-in or standalone software), in a machine (e.g., a computer system, a microprocessor-based appliance, etc.) that includes software in memory, or in a non-transitory computer-readable storage medium configured to carry out the installment payment schemes (e.g., in a self contained silicon device, a solid state memory, an optical disc, or a magnetic disc, among others).

Techniques consistent with the present disclosure provide, among other features, a system and method of installment payment transactions. The foregoing description of an implementation of the invention has been presented for purposes of illustration and description. It is not exhaustive and does not limit the disclosure to the precise form disclosed. Modifications and variations are possible in light of the above teachings or may be acquired from practicing of the disclosure. The scope of the invention is defined by the claims and their equivalents.

What is claimed is:

1. A computer-implemented method for managing installment payment transactions associated with a credit card account of a customer, comprising:

storing, in a storage device of a server of an installment service, predetermined parameters received from an issuing bank of the credit card account;

receiving, by a processor of the server, from at least one of an Automated Teller Machine (ATM) or a point-of-sale (POS) device of a merchant, credit card transaction information, including a transaction amount to be applied against a credit card account of a customer;

calculating, on behalf of the issuing bank, by the processor the server, an installment payment amount for the credit card transaction on a basis of said predetermined parameters received from the issuing bank and stored in the storage device and the credit card transaction information received from the ATM or the POS device;

generating, by the server, a message for transmission to a mobile device of the customer, wherein the message is generated based on the installment payment amount calculated by the server, formatting, by the server, the generated message according to a predetermined messaging format; and with requiring neither merchant involvement nor customer initiation, transmitting, by the processor of the server, the generated and formatted message to the mobile device of the customer, wherein transmitted message (i) includes an installment payment offer based on the calculated installment payment amount and (ii) is displayed on said mobile device enabling customer selection of an installment payment offer at a location other than the merchant.

2. The method of claim 1, further comprising receiving, at the server, an electronic acceptance of the installment payment offer from the mobile device.

3. The method of claim 1, wherein the mobile device is a cellular phone.

4. The method of claim 1, wherein the message including the installment payment offer is transmitted to and displayed by the mobile device in Short Message Service (SMS) format.

5. The method of claim 2, wherein the electronic acceptance of the installment payment offer is received at the server as a Short Message Service (SMS message).

6. The method of claim 1, wherein the installment service is a credit card network provider.

7. The method of claim 1, further comprising:
determining, by the server, on behalf of the issuing bank, whether the credit card transaction is eligible for payment in installments for the credit card account based on the credit card transaction information received from the ATM or POS device of the merchant and the predetermined parameters received from the issuing bank.

8. The method of claim 7, wherein the credit card transaction is eligible for payment in installments if the credit card transaction includes a purchase transaction at the POS device of the merchant.

9. The method of claim 7, wherein the credit card transaction is eligible for payment in installments if the credit card transaction includes an ATM cash withdrawal.

10. The method of claim 7, wherein the credit card transaction is eligible for payment in installments if the credit card transaction exceeds a predetermined minimum transaction amount.

11. The method of claim 2, further comprising:
transmitting, by the server, to the mobile device of the customer, an electronic confirmation message, said electronic confirmation message confirming the acceptance of the installment payment offer.

12. The method of claim 2, further comprising:
initiating, by the installment service, reversal of the credit card transaction responsive to acceptance of the installment payment offer; and
repeatedly initiating an installment payment transaction associated with the credit card account based on the installment payment amount calculated during the calculating step.

13. The method of claim 1 wherein the electronic message including the installment payment offer is transmitted to the mobile device of the customer subsequent to the authorization of the transaction amount to be applied against the credit card of the customer.

14. An electronic system for managing installment payment transactions associated with a credit card account comprising:
a storage device, of a server of an installment service, for storing predetermined parameters received from an issuing bank of the credit card account; and
a processor, of the server, said processor configured to
receive, from an Automated Teller Machine (ATM) or a point-of-sale (POS) device of a merchant, credit card transaction information, including a transaction amount to be applied against a credit card account of a customer,
calculate an installment payment amount for the credit card transaction on a basis of said predetermined parameters received from the issuing bank and stored in the storage device and the credit card transaction information received from the ATM or the POS device,
generate a message for transmission to a mobile device of the customer, wherein the message is generated based on the calculated installment payment amount,
format the generated message according to a predetermined messaging form, and
transmit, with requiring neither merchant involvement nor customer initiation, the generated and formatted message to the mobile device of the customer, wherein said transmitted message (i) includes an installment payment offer based on the calculated installment payment amount and (ii) is displayed on said mobile device enabling customer selection of an installment payment offer at a location other than the merchant.

15. The system of claim 14, wherein the processor is further configured to detect an acceptance of the installment payment offer from the mobile device.

16. The system of claim 14, wherein the mobile device is a cellular telephone.

17. The system of claim 14, wherein the message including the installment payment offer is transmitted to and displayed on the mobile device in Short Message Service (SMS) message.

18. The system of claim 15, wherein the acceptance of the installment payment offer is detected by said processor as a Short Message Service (SMS) message.

19. The system of claim 14, wherein the installment service includes a credit card network provider.

20. The system of claim 14, wherein the processor of the server is further configured to determine, on behalf of the issuing bank, whether the credit card transaction is eligible for payment in installment for the credit card account based on the credit card transaction information received from the ATM or the POS device of the merchant and the predetermined parameters received from the issuing bank.

21. The system of claim 20, wherein the processor determines that the credit card transaction is eligible for payment in installments responsive to the credit card transaction being a purchase transaction.

22. The system of claim 20, wherein the processor determines that the credit card transaction is eligible for payment in installments responsive to the credit card transaction being a cash withdrawal.

23. The system of claim 20, wherein the processor determines that the credit card transaction is eligible for payment in installments if it exceeds a predetermined minimum transaction amount.

24. The system of claim 15, wherein the processor is further configured to transmit an electronic confirmation message to the mobile device of the customer following the detecting of the acceptance, said electronic confirmation message confirming acceptance of the installment payment offer.

\* \* \* \* \*